(12) United States Patent
Bat et al.

(10) Patent No.: US 9,636,653 B2
(45) Date of Patent: May 2, 2017

(54) STAMP FOR MAKING A MICROARRAY OF BIOMOLECULES

(71) Applicants: TECHNISCHE UNIVERSITEIT TWENTE, Enschede (NL); STICHTING DIENST LANDBOUWKUNDIG ONDERZOEK, Wageningen (NL)

(72) Inventors: Erhan Bat, Los Angeles, CA (US); Pascal Jonkheijm, Gronau (DE); Aart Van Amerongen, Veenendaal (NL); Jurriaan Hüskens, Enschede (NL)

(73) Assignees: TECHNISCHE UNIVERSITEIT TWENTE, Enschede (NL); STICHTING DIENST LANDBOUWKUNDIG ONDERZOEK, Wageningen (NL)

( * ) Notice: Subject to any disclaimer, the term of this patent is extended or adjusted under 35 U.S.C. 154(b) by 52 days.

(21) Appl. No.: 14/431,524

(22) PCT Filed: Sep. 24, 2013

(86) PCT No.: PCT/EP2013/069873
§ 371 (c)(1),
(2) Date: Mar. 26, 2015

(87) PCT Pub. No.: WO2014/048930
PCT Pub. Date: Apr. 3, 2014

(65) Prior Publication Data
US 2015/0306560 A1    Oct. 29, 2015

(30) Foreign Application Priority Data

Sep. 28, 2012  (EP) .................................... 12186681
May 16, 2013   (EP) .................................... 13168047

(51) Int. Cl.
C40B 60/14   (2006.01)
B01J 19/00   (2006.01)
B05D 1/18    (2006.01)

(52) U.S. Cl.
CPC .......... B01J 19/0046 (2013.01); C40B 60/14 (2013.01); *B01J 2219/00382* (2013.01);
(Continued)

(58) Field of Classification Search
CPC .......... B01J 19/0046; B01J 2219/00382; B01J 2219/00585; B01J 2219/00605;
(Continued)

(56) References Cited

U.S. PATENT DOCUMENTS

| 5,948,621 A | 9/1999 | Turner et al. |
| 2008/0280785 A1 | 11/2008 | Tseng et al. |
| 2008/0287322 A1 | 11/2008 | Klapproth et al. |

FOREIGN PATENT DOCUMENTS

| JP | 2001-343385 A | 12/2001 |
| WO | 01 43876 A1 | 6/2001 |

OTHER PUBLICATIONS

Salim, A. et al., Micromachined Hydrogel Stamper for Soft Printing of Biomolecules with Adjustable Feature Dimensions, American Chemical Society, 2009, Analytical Chemistry, vol. 81, No. 11, Jun. 1, 2009, pp. 4551-4554.

(Continued)

*Primary Examiner* — Jeremy C Flinders
(74) *Attorney, Agent, or Firm* — Hudak, Shunk & Farine Co. LPA (57) ABSTRACT

A stamp for making a microarray of biomolecules, wherein the stamp has a stamp body having a stamping surface for stamping the biomolecules onto a substrate, a plurality of reservoirs for liquids having the biomolecules, wherein each of the reservoirs has a bottom wall and a plurality of (Continued)

channels extending between each of the bottom wall and the stamping surface, wherein each of the reservoirs and the channels has a macroporous hydrogel and wherein the stamping surface is provided with a hydrophobic coating.

20 Claims, 5 Drawing Sheets

(52) U.S. Cl.
CPC ................. *B01J 2219/00585* (2013.01); *B01J 2219/00596* (2013.01); *B01J 2219/00605* (2013.01); *B01J 2219/00619* (2013.01); *B01J 2219/00659* (2013.01); *B05D 1/18* (2013.01)

(58) Field of Classification Search
CPC .... B01J 2219/00619; B01J 2219/00659; B01J 2219/00596; C40B 60/14; B05D 1/18
See application file for complete search history.

(56) References Cited

OTHER PUBLICATIONS

Plummer, J., et al., Silicon VLSI Technology Fundamentals, Practice and Models, Solutions Manual for Instructors, Prentice Hall, 2000, pp. 1-157.

STAMP FOR MAKING A MICROARRAY OF BIOMOLECULES

FIELD OF THE INVENTION

The present invention relates to a stamp for making a microarray of biomolecules. The present invention further relates to a process for making such a stamp.

BACKGROUND OF THE INVENTION

Several ways are known for printing biomolecules onto a substrate. In one known method, a needle is dipped in a liquid containing biomolecules to hold the liquid. The needle is subsequently brought close to or in contact with the desired position of the substrate to transfer the liquid onto the substrate.

Another method uses a microstamp. US2008/0280785 describes a fluidic nano/micro array chip for stamping a plurality of nano/micro liquid droplets of a plurality of sample solutions on a biochip. The chip comprises a liquid containing layer filled with and transporting the sample solutions; a vertical transporting layer comprising a plurality of vertical channels connected to the liquid containing layer, wherein the vertical channels can transport the sample solutions; and a stamping head layer comprising a plurality of stamping heads respectively connected to the vertical channels. Each of the stamping heads includes a pipe.

This chip allows printing many samples simultaneously. There is a limit on how small the size of the pipes can be made, which determines the size of the spots which constitute the microarray. While the resulting microarray is satisfactory for some cases, the limited homogeneity and the relatively large size of the spots which constitute the microarray limit its applications.

U.S. Pat. No. 5,948,621 discloses a molecular stamp comprising: a solid substrate support; a polymeric gel covalently bound to said solid support so as to form an exposed patterned surface, said patterned surface including a raised region comprising said polymeric gel and at least one indentation within said raised region; said polymeric gel having absorbed therein a liquid vehicle, said liquid vehicle having a first biomolecules dissolved or colloidally suspended therein. In one of the embodiments, the stamp is an array of microcapillaries filled with a polymeric gel and connected to reservoirs holding a solution/suspension of a biomolecules of interest. The microcapillaries are made of glass. The polymeric gel may be a hydrogel formed by crosslinking 6-acryloyl-beta-O-methylgalactoside.

It is a drawback of the array of microcapillaries that microcapillaries lack mechanical robustness for repetitive printing. The tip of the microcapillaries having very thin walls come into contact with the substrate to be printed. Also, the hydrogel used in U.S. Pat. No. 5,948,621 swells excessively to allow diffusion of large biomolecules. However, this excessive swelling also leads to poor mechanical strength of the gel. With these hydrogels, it is difficult to control the shape of the spots and the hydrogel easily wears during printing which limits the lifetime of the stamp to a small number of printings.

SUMMARY OF THE INVENTION

It is an object of the present invention to provide a stamp for making a microarray of biomolecules in which the above-mentioned and/or other drawbacks are reduced.

Accordingly, the present invention provides a stamp for making a microarray of biomolecules, wherein the stamp comprises a stamp body comprising
a stamping surface for stamping the biomolecules onto a substrate,
a plurality of reservoirs for liquids comprising the biomolecules, wherein each of the reservoirs has a bottom wall and
a plurality of channels extending between each of the bottom wall and the stamping surface,
wherein each of the reservoirs and the channels comprises a macroporous hydrogel and wherein the stamping surface is provided with a hydrophobic coating.

The term "macroporous hydrogel" is herein understood as a hydrogel having a three-dimensional network with pores which can retain biomolecules.

For the use of the stamp according to the present invention, liquids comprising biomolecules are filled in the reservoirs. The biomolecules enter the channels extending between the bottom of the reservoirs and the stamping surface. The hydrogel in the channels limits the speed of the biomolecules passing through the channels. The hydrogel retains the liquids and the biomolecules in the stamp until the hydrogel comes into contact with the substrate on which the biomolecules are to be printed. Upon contact, a microarray of biomolecules corresponding to the pattern of the reservoirs and the pattern of the channels is formed on the substrate. The shape of the microarray corresponds to the arrangement of the reservoirs. The shape of the groups of the spots corresponds to the arrangement of the channels. The liquids and the biomolecules in the reservoirs move to the channels and refill the channels as the liquids and the biomolecules are transferred to the substrate by stamping.

The reservoirs comprising the hydrogel in the stamp according to the present invention act as storage chambers for the biomolecules. The hydrogels prevent evaporation of the liquids and denaturation of the biomolecules. This allows the stamp according to the invention to hold amounts of liquids sufficient for a large number of repeated stampings, e.g. of more than 100 times, without refilling of the reservoirs and without an additional storage. Unlike a bundle of microcapillaries in the prior art where the tips of the microcapillaries have to be aligned with respect to each other, channels formed in a stamping body according to the present invention do not require the step of the alignment. Moreover, the stamping body with channels is much more robust than a bundle of channels.

A stamping process using the stamp according to the present invention is advantageous compared to a method using a needle dipped in a liquid comprising biomolecules. The latter method does not allow a high definition in the microarray. It also requires longer time to generate an array of biomolecules since the spots have to be printed one by one. The stamp according to the present invention allows printing to be continued by refilling the reservoirs without a significant lag time. The used stamp can be washed with a surfactant solution and can be re-used for printing another molecule without cross-contamination.

The stamp according to the present invention allows simultaneous printing of a large number of biomolecules. The hydrogel in the channels allows the biomolecules to be transported from the reservoirs to the stamping surface at a controlled speed. The hydrogels may slightly protrude from the channels. In the prior art chip in which the sample solutions are transported through channels without a hydrogel, there is a risk that the sample solutions drop on the substrate prematurely at non-desired locations. The chip according to the present invention holds the sample liquids in the hydrogel and transfers the liquids to the substrate when the hydrogels come in contact with the substrate, avoiding premature dropping of the liquids. The size and the shape of the deposited spots match well with the openings of the channels, resulting in a homogeneous microarray of biomolecules with a controlled size.

The stamp according to the present invention comprises multiple reservoirs each having multiple channels. An advantage of multiple reservoirs each having a limited number of channels over one reservoir having a very large number of channels is that the walls between the reservoirs give the chip mechanical strength for handling. This allows a large dimension of the stamp. A further advantage of the multiple reservoirs is that different types of biomolecules can be printed with one stamp.

The stamp according to the invention is especially useful for medical diagnostics, protein characterization and drug discovery, as well as for determining environmental or food quality and safety, as well as cell patterning, cell arrays and drug screening on cell arrays. A further application is in the field of dietary advice. For example, protein blood levels of obese patients can be measured to determine whether they will profit most from a protein-rich or restricted-protein diet. A further application is in the early detection of farm-animal diseases, aimed at increasing food safety.

The stamping surface is provided with a hydrophobic coating. This allows the liquid at the tip of the hydrogel in the channel to be retained in the hydrogel rather than moving and spreading towards the areas on the stamping surface surrounding the channel. Spilling and satellite drops can be circumvented employing this hydrophobic coating, which results in repetitive printed arrays of high resolution and fidelity. The hydrophobic coating preferably comprises fluorinated alkylsilanes such as a perfluoroalkylsilane with the general formula: $CF_3—(CF_2)_n—(CH_2)_m—SiX_3$, wherein n is an integer from 0 to 12, m is an integer from 2 to 5 and X is a hydrolyzable group. Preferably, the hydrolyzable groups are independently selected from the group consisting of (a) organic groups linked to the silicon atom by an oxygen bond, preferably an alkoxy group, and (b) halogens, preferably chlorines. More preferably, said perfluoroalkylsilane is selected from the group consisting of 1H, 1H, 2H, 2H-perfluorooctyltrichlorosilane, 1H,1H,2H,2H-perfluorodecyltrichlorosilane, and 1H, 1H, 2H, 2H-perfluorododecyltrichlorosilane. Particularly preferred is perfluorodecyltrichlorosilane (PFDTS). Other suitable materials for the hydrophobic coating may be long-chain alkylsilanes having at least 6 carbon atoms, preferably at least 10, more preferably at least 16. Examples of such long-chain alkylsilanes include dodecylsilanes and octadecyltrichlorosilanes. Other suitable materials for the hydrophobic coating may be long-chain acylglycerols having at least 12 carbon atoms, sterol derivatives, pentafluorophenyl derivatives or reaction products with fatty acids having at least 10 carbon atoms such as stearic acid or palmitic acids The reaction products with fatty acids may e.g. be formed by coupling fatty acids to amino-functionalized surfaces.

It is noted that US2008/0287322 discloses in paragraph [0042] an apparatus intended for the application of aqueous solutions on a hydrophilic surface areas of a base body. The hydrophilic surface areas are separated from each other by at least one hydrophobic surface area. This apparatus has a mounting plate comprising openings and reservoirs arranged in a matrix pattern. The openings are filled with absorbent substrate. The mounting plate is not provided with a hydrophobic coating and the mounting plate is to be used only on a base body having hydrophilic surface areas at locations corresponding to the openings of the mounting plate. Unlike the mounting plate of US2008/0287322, the stamp according to the invention has a hydrophobic coating on the stamping surface which prevents the liquid at the tip of the hydrogel to spill to non-desired positions. A high resolution of the printed image is thus obtained on any substrate.

The volume of the reservoir may e.g. be 4-100 nL, preferably 10-50 nL. These ranges are suitable for making a microarray of biomolecules. The depth of the reservoir may e.g. be 100-1000 μm. The reservoir may have a cross section of 10000 $μm^2$ to 200000 $μm^2$, preferably 50000 $μm^2$ to 150000 $μm^2$.

The stamp has a plurality of reservoirs, typically 5-100, 10-50 or 15-40 reservoirs.

Preferably, the distance between the reservoirs is at least 100 μm, i.e. the walls between the reservoirs preferably have a thickness of at least 100 μm. This has the advantage that the chip is mechanically strong enough. In the cases in which the reservoirs do not have a straight side wall, i.e. the walls do not have a constant thickness, the thickness is understood to mean the smallest distance between the side walls of neighboring reservoirs. Preferably, the reservoirs have a straight side wall for easy production. More preferably, the distance between the reservoirs is at least 150 μm. Typically the distance between the reservoirs is at most 750 μm or at most 500 μm.

The length of the channels is preferably 0.1-100 μm, more preferably 10-25 μm. This results in a homogeneous stamping among the channels. The cross section of the channels is preferably 0.1-100 $μm^2$, more preferably 1-75 $μm^2$, more preferably 5-50 $μm^2$, more preferably 10-30 $μm^2$.

The channels may in principle have any cross section, for example circular, square ellipsoidal or rectangular. Circular is advantageous for applications such as rapid screening and diagnostic applications. Non-circular shapes are advantageous for other applications such as tissue regeneration and biomaterials development because the optimal size and shape of a cell signaling biomolecules/protein can be rapidly determined. By adjusting the separation between the features, it can also be determined how closely these signaling biomolecules need to be placed to get a specific cell response, such as cell spreading, cell proliferation, cell migration etc. The dimensions of the channels of the stamp are preferably the same among the channels in the same reservoir. Different reservoirs may have channels with different dimensions.

Preferably, each reservoir comprises at least 50 channels, more preferably at least 100 channels. A large number of printed spots ensures that a statistical analysis may be performed.

Preferably, the distance between the channels is at least 1 μm, i.e. the walls between the channels have a thickness of at least 1 μm. The thickness of the walls between the channels in this range gives a sufficient mechanical strength to the channels and the resulting microarray is precisely stamped. The stamp becomes 'wavy' when the thickness of the walls between the channels is too low. The thickness of the walls is more preferably at least 5 μm, more preferably at least 10 μm. The upper limit of the thickness of the walls between the channels is only set by the process costs, and typically is at most 100 μm, at most 50 μm or at most 30 μm. the optimal separation between the channels depends on the diameter of the channels and the thickness of the membrane. As the channels become closer to each other (walls between the channels become thinner) and the channels become longer, it is more difficult to make the channels: when long channels close to each other are made by etching a silicon wafer, the etching could lead to excessive heat build-up and cracking of the silicon wafer. The cross section of the channels, the thickness of the walls between the channels and the distance between the bottom surface of the reservoir and the stamping surface (length of the channels) should be chosen to provide a robust stamp while the manufacturing is reliable.

In particularly preferred embodiments, each of the reservoirs has a volume of 4-100 nL, the walls between the reservoirs have a thickness of at least 100 µm, each of the channels has a length of 0.1-100 µm and a cross section of 0.1-100 µm² and the walls between the channels have a thickness of at least 1 µm.

Preferably, the hydrogel is made by polymerizing a monomer mixture solution comprising a monomer comprising a hydroxyl or an amino group, wherein the monomer is selected from the group consisting of (meth)acrylate, (meth)acrylamide and vinyl carbamate. Preferred examples of (meth)acrylate comprising a hydroxyl group include 2-hydroxyethyl methacrylate, 2-hydroxyethyl acrylate, 3-hydroxypropyl methacrylate, hydroxyhexyl methacrylate and hydroxyoctyl methacrylate. Preferred examples of (meth)acrylate comprising an amino group include 2-aminoethyl methacrylate, 2-aminoethyl acrylate, 3-aminopropyl methacrylate.

Preferred examples of (meth)acrylamide comprising a hydroxyl group include 2-hydroxyethyl methacrylamide and 2-hydroxyethyl acrylamide.

Preferred examples of (meth)acrylamide comprising an amino group include N-2-aminoethyl methacrylamide.

Preferred examples of vinyl carbamate comprising a hydroxyl group include N-2-hydroxyethyl vinyl carbamate.

Particularly preferred is 2-hydroxyethyl methacrylate.

These monomers comprising the hydroxyl group or the amino group contain an oxygen atom carrying a lone pair of electrons, which allows a favorable interaction with cross-linkers. Phase separation involved in the formation of hydrogel by the polymerization of these monomers can then be modulated by controlling the conditions of the polymerization such as pH and interaction strength. The possibility for modulating the phase separation allows controlling the pore size, which is advantageous for high resolution printing. The monomers lacking lone-pair electron bearing atoms such as acrylamide without a hydroxyl or an amino group do not have this advantage of the modulation of the phase separation.

These monomers are relatively less hydrophilic. Less hydrophilic hydrogels do not show large shrinking-swelling in response to contacting with water. This leads to a robust hydrogel having a high mechanical strength. Moreover, the decrease in the pore size is not large after contacting with water. Preferably, the hydrogel has a pore size of 0.1-1 µm. The pore size of the hydrogel can be measured by treating the stamp with critical point drying and imaging it with SEM. This allows printing of proteins of a large size range, from <10 kDa to 900 kDa. Preferably, the polymerization is performed in the presence of a crosslinker with two or more double bonds such as ethylene glycol dimethacrylate ("EGDMA"), trimethylolpropane trimethacrylate ("TMPTMA"), glycerol trimethacrylate, polyethylene glycol dimethacrylate, N,N'-methylene bisacrylamide. Particularly preferred is EGDMA. The cross-linking agent is typically used in an amount of 0.25 to 0.75 mol % with respect to the monomer.

The hydrogel is prepared from a solution of monomers to be polymerized. The solution may comprise any suitable additional components, such as an initiator for the polymerization. It was found that the monomer solution preferably contains 15-25 vol % of the monomer. Lower monomer content leads to less homogeneous microarray and more spots in undesired locations. The monomer content of more than 25 vol % was found to result in a non-macroporous structured hydrogel. Preferably, the monomer solution preferably contains 23-25 vol % of the monomer. This resulted in an especially homogeneous microarray and very small number of spots in undesired locations.

Preferably, the hydrogel is attached to the inner surfaces of the reservoirs and the channels. This is preferably done by a coating provided on the inner surfaces of the reservoirs and the channels, which coating acts as an adhesion promoter for the hydrogel.

The adhesion promoter coating preferably comprises a compound represented by the general formula:

where R is an organic functional group containing a (meth)acryloyl group and X represents a hydrolyzable group. R is preferably a group represented by the general formula where m is an integer of 1 to 3 and R1 is a hydrogen atom or methyl group.

Preferred examples of R include 3-methacryloyloxypropyl, methacryloyloxymethyl, and 3-acryloyloxypropyl groups. The hydrolyzable group X in the general formula is not limited as long as it is hydrolyzable. Examples of the hydrolyzable group X include alkoxy and acetoxy groups. Of those, an alkoxy group is preferable. Examples of the alkoxy groups include methoxy, ethoxy, n- and i-propoxy, and n-, i-, and t-butoxy groups. Of those, the methoxy groups having high reactivity are preferable.

Preferred examples of the silicone compounds represented by the general formula (I) include methacryloyloxymethyl triethoxysilane, methacryloyloxymethyl trimethoxysilane, 3-methacryloyloxypropyl trichlorosilane, 3-methacryloyloxypropyl trimethoxysilane, 3-methacryloyloxypropyl triethoxysilane, 3-acryloyloxypropyl trimethoxysilane, and 3-acryloyloxypropyl trichlorosilane. Of those, 3-methacryloyloxypropyl trichlorosilane is preferably used.

The stamping surface is provided with a hydrophobic coating. This allows the liquid at the tip of the hydrogel in the channel to be retained in the hydrogel rather than moving towards the areas on the stamping surface around the channel. The resolution of the printed image is thus high. The hydrophobic coating preferably comprises fluorinated alkyl silanes such as perfluorodecyltrichlorosilane (PFDTS) or long-chain alkyl silanes such as octadecyltrichlorosilanes.

The stamp body may be made e.g. of glass, silica, silicon, polystyrene, polyimides and poly(ether) sulfone.

In principle, the present invention may be used to stamp a substrate with any biomolecules by selecting an appropriate solvent/liquid vehicle and polymer. Typically, the present invention is used for printing biomolecules of about 1000 to about 900,000 Daltons onto substrates. It is herein understood that the term biomolecule also includes biomolecules coated nanoparticles, typically of 1-50 nm in size. It is an advantage of the stamp according to the invention that it allows the printing of biomolecules of high molecular weight such as more than 250,000 Daltons. Typical biomolecules that may be stamped using the present invention include peptides, proteins (e.g. antibody such as immunoglobulin M), DNA.

The liquid of the biomolecules preferably has a concentration of 0.05-10 μM. A concentration of at most 5 μM, 1 μM or 0.5 μM is preferred since this requires less amount of the expensive biomolecules.

Any surface may be used as a substrate in the method of the present invention. The substrate may be planar or non-planar. Typical substrates include glass, silica, silicon, polydimethylsiloxane and polystyrene and nitrocellulose. The molecule being stamped should be able to adhere to the substrate sufficiently to satisfy the purpose for which the stamped pattern is intended, such as the formation of a useful biosensor.

Any rigid surface to which the polymeric gel may be adhered, preferably irreversibly and preferably by covalent bonding, may be used as a backing support for the polymer gel. Typically, the backing support is planar, but planarity is not a requirement. For example, if desired, the backing support may take the form of a roller.

The present invention also provides a stamp comprising the liquid comprising the biomolecules.

Another aspect of the invention provides a process for making a microarray of biomolecules comprising the step of stamping a substrate by the stamp according to the invention comprising the liquid comprising the biomolecules.

Another aspect of the invention provides a process for making the stamp according to the invention, comprising
a. providing a stamp body comprising
   a stamping surface for stamping the biomolecules onto a substrate,
   a plurality of reservoirs for liquids comprising the biomolecules, wherein each of the reservoirs has a bottom wall and
   a plurality of channels extending between each of the bottom wall and the stamping surface and
b. providing a macroporous hydrogel in the reservoirs and the channels to form the stamp.

Preferably, step b. comprises the sub-steps of:
b1. providing a coating of an adhesion promoter on the inner surfaces of the reservoirs and the channels,
b2. dipping the stamp body in a solution of reactive monomers and
b3. reacting the reactive monomers to form the macroporous hydrogel.

Preferably, the process further comprises the step of providing a hydrophobic coating on the stamping surface before step b1. This may be done by providing the hydrophobic coating on all surfaces of the stamp body (e.g. by gas phase silanization), contacting the stamping surface with a flat protective surface e.g. of PDMS (polydimethylsiloxane) and etching the hydrophobic coating on the surfaces except for the stamping surface.

It will be appreciated that the materials described above referring to the stamp according to the invention may preferably be used for the process for making the stamp according to the invention.

Another aspect of the invention provides a process for making the stamp body according to the present invention, comprising the steps of:
a1. providing a silicon-on-insulator wafer comprising a silicon dioxide layer sandwiched by a first silicon layer and a second silicon layer,
a2. providing a photoresist layer on the first silicon layer,
a3. exposing the photoresist layer on the first layer with a first pattern of UV light, the first pattern corresponding to the cross section of the channels or to the cross section of the reservoirs,
a4. removing the photoresist exposed to the UV light,
a5. removing silicon from the parts of the first silicon layer which are not covered by the photoresist layer,
a6. removing the remaining photoresist on the first silicon layer, preferably by oxygen plasma treatment,
a7. providing a photoresist layer on the second silicon layer,
a8. exposing the photoresist layer on the second layer with a second pattern of UV light, the second pattern corresponding to the cross section of the reservoirs or to the cross section of the channels, the second pattern being different from the first pattern,
a9. removing the photoresist exposed to the UV light,
a10. providing a protective layer on the patterned first silicon layer,
a11. removing silicon from the parts of the second silicon layer which are not covered by the photoresist layer,
a12. removing the protective layer and the remaining photoresist on the second silicon layer, preferably by oxygen plasma treatment and
a13. removing silicon dioxide from the parts of the silicon dioxide layer not covered by the second silicon layer.

The first pattern may correspond to the cross section of the reservoirs and the second pattern may correspond to the cross section of the channels. However, preferably, the first pattern corresponds to the cross section of the channels and the second pattern corresponds to the cross section of the reservoirs.

The silicon dioxide layer preferably has a thickness of 0.1-1 μm. The small thickness is advantageous for the ease of removal step.

The reservoirs are formed from the silicon layer exposed to the pattern corresponding to the cross section of the reservoirs and the silicon dioxide layer. Accordingly, the silicon layer exposed to the pattern corresponding to the cross section of the reservoirs preferably has a thickness substantially corresponding to the depth of the reservoirs, e.g. 100-1000 μm.

The channels between the bottom walls of the reservoirs and the stamping surface are formed from the silicon layer exposed to the pattern corresponding to the cross section of the channels. Accordingly, the silicon layer exposed to the pattern corresponding to the cross section of the reservoirs preferably has a thickness substantially corresponding to the length of the channels, e.g. 15-100 μm.

The process employs photolithography, which is per se well known. Suitable conditions and details can be found in various literature, including Silicon VLSI Technology: Fundamentals, Practice, and Modeling, James D. Plummer, Michael Deal, Peter D. Griffin, Prentice Hall and Photolithography: A Manual (2002) by Tamarind Institute.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

BRIEF DESCRIPTION OF THE DRAWINGS

The invention will now be further illustrated referring to the figures in which.

DETAILED DESCRIPTION OF THE INVENTION

Figure 1:
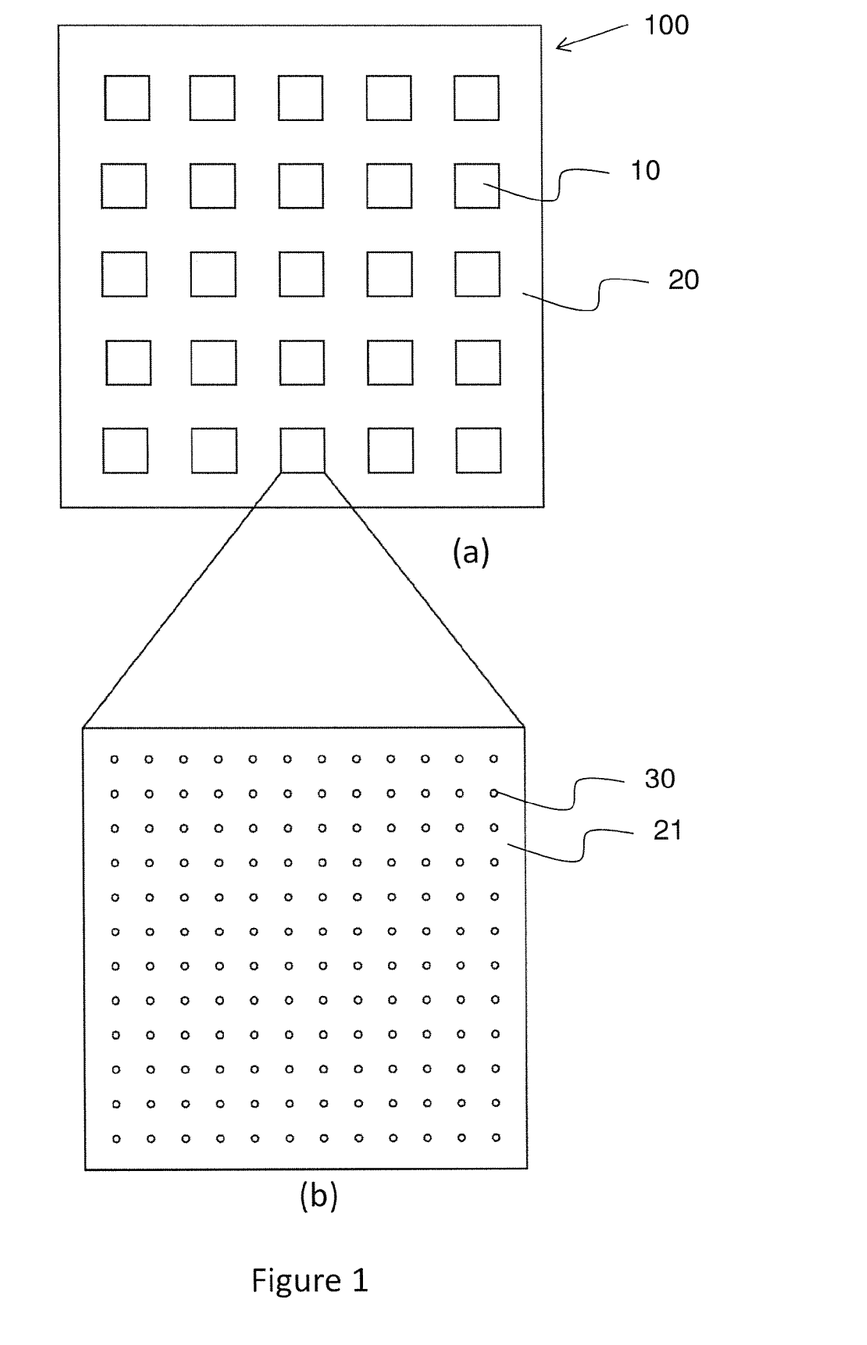
FIG. 1 is a top view of a schematic example of the stamp according to the invention.

FIG. 1 is a top view of a schematic example of a stamp 100 for making a microarray according to the invention. FIG. 1(a) illustrates the stamp 100 and FIG. 1(b) is an enlarged view of one of the reservoirs 20 in FIG. 1(a).

In this example, the stamp 100 comprises a stamp body 10 comprising an array of 5×5 reservoirs 20. The reservoirs 20 are square shaped with sides of 320 µm. The distance between the reservoirs 20 are also 320 µm. Each of the reservoirs 20 has a bottom wall 21 from which channels 30 extend towards the stamping surface (not shown). The channel has a circular cross section with diameter of 5 µm. The distance between the channels is 20 µm.

Figure 2:
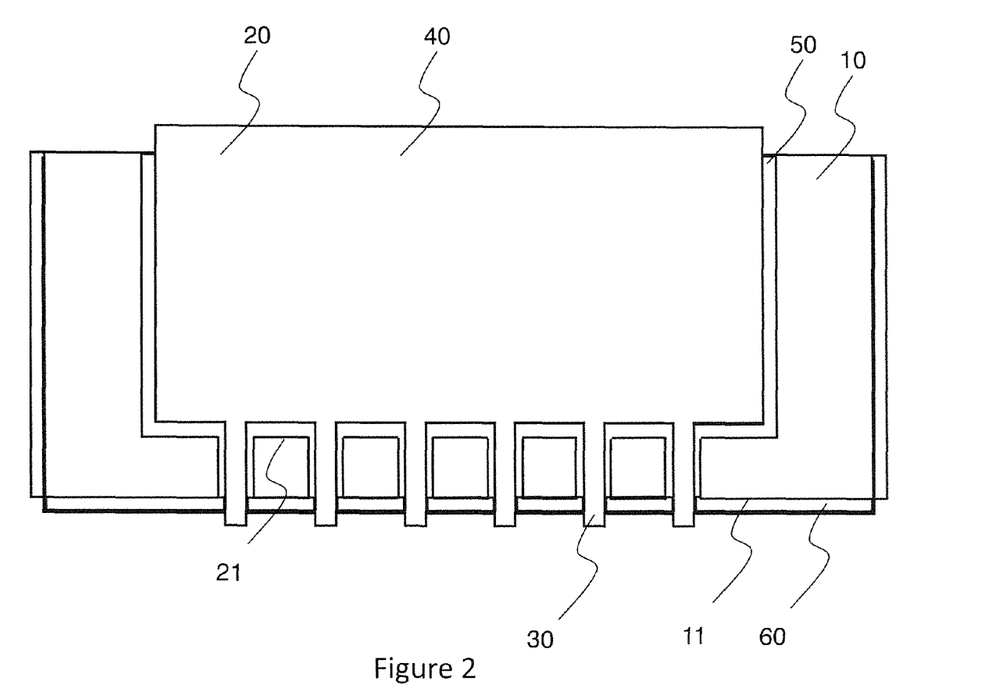
FIG. 2 is a vertical cross-section of a schematic example of a part of the stamp according to the invention.

FIG. 2 is a vertical cross-section of a schematic example of a part of the stamp according to the invention 100 provided with a hydrophobic coating 60. FIG. 2 schematically shows an enlarged view of one reservoir 20 of the stamp 100 according to the invention. The stamp body 10 has a stamping surface 11. The reservoir 20 has a bottom wall 21. Channels 30 extend between the bottom wall 21 and the stamping surface 11. The reservoir 20 and the associated channels 30 are filled with a hydrogel 40. An adhesion promoter coating 50 is provided on the inner walls of the reservoir 20 and the associated channels 30. The hydrogel 40 is adhered to the adhesion promoter coating 50 and slightly protrudes from the stamping surface 11.

Figure 3:
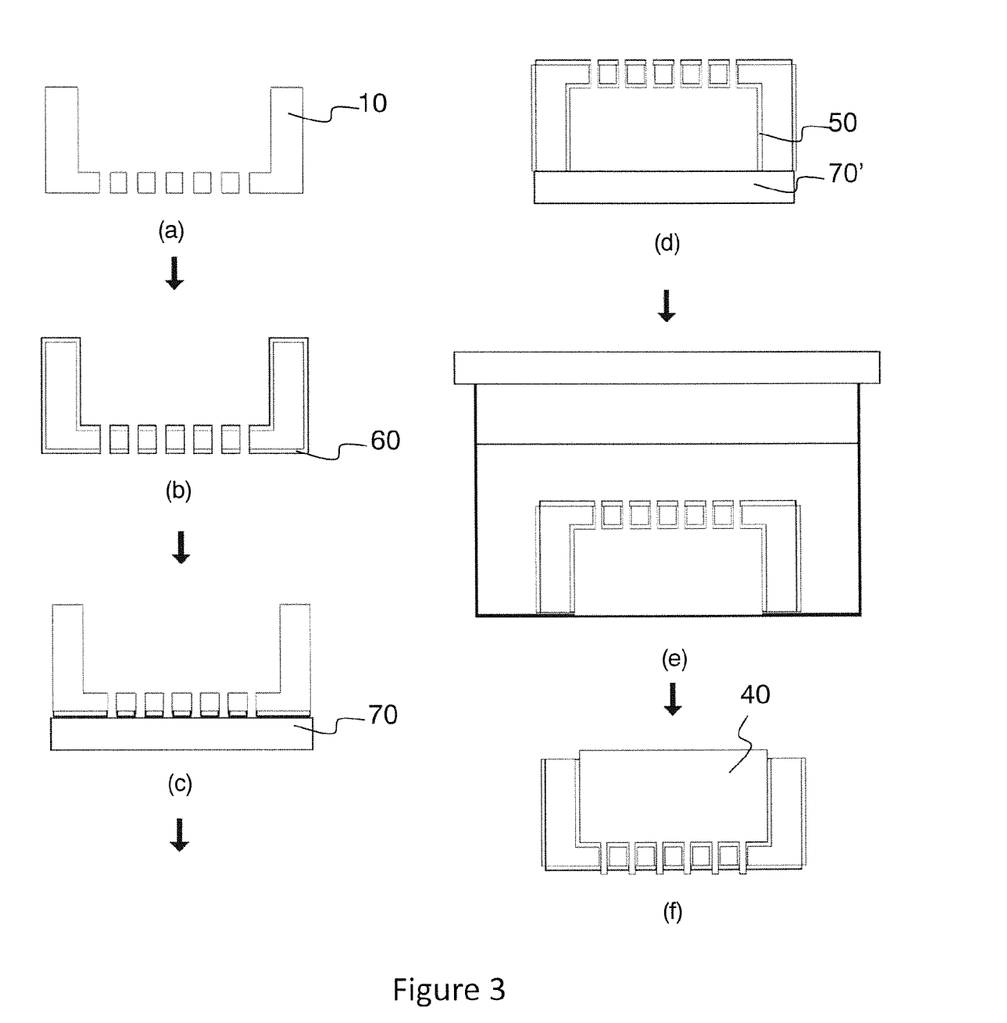
FIG. 3 schematically illustrates an example of a process for preparing the stamp according to the invention and FIG. 4 schematically illustrates an example of a process for preparing a stamp body according to the invention.

FIG. 3 schematically illustrates an example of a process for preparing a stamp for making a microarray according to the invention. FIG. 3(a) illustrates one reservoir 20 and associated channels 30 of a stamp body 10.

As shown in FIG. 3(b), the surfaces of the stamp body is first provided with a hydrophobic coating 60, e.g. of PFDTS. The hydrophobic coating 60 on the stamping surface 110 is brought into contact with a protective layer 70 of e.g. PDMS. The stamp body is subsequently treated with O2 plasma and the hydrophobic coating 60 on the surfaces not in contact with the protective layer 70 is removed, the result being shown in FIG. 3(c). Although not shown in the figure, a further protective layer may be provided on the surface of the stamp body opposite of the stamping surface 110 before the stamp body is treated with O2 plasma. This results in the hydrophobic coating remaining also on said opposite surface of the stamp body.

The surface of the stamp body opposite of the stamping surface 110 is brought into contact with a protective layer 70' which may e.g. be made of PDMS. Subsequently an adhesion promoter coating 50 is provided on the surfaces of the stamp body which are not covered by the hydrophobic coating 60 or the protective layer 70', i.e. the inner surfaces of the reservoir 20 and the channels 30 and the outer side walls of the stamp body 10. The stamp body 10 is now provided with the hydrophobic coating 60 on its stamping surface and the adhesion promoter coating 50 on the inner surfaces of the reservoirs 20 and the channels 30 and the outer side walls of the stamp body 10, as shown in FIG. 3(d).

The coated stamp body is then immersed in a solution of reactive monomers of e.g. HEMA and EGDMA and other components necessary for the reaction, as shown in FIG. 3(e).

The reactive monomers are reacted and crosslinked, resulting in a hydrogel 40 filling the reservoirs 20 and the channels 30 and attached to the adhesion promoter coating 50 provided on the inner walls of the reservoirs 20 and the channels 30, as shown in FIG. 3(f). The hydrogel 40 slightly protrudes from the channels. The hydrogel is formed also on the outer side walls of the stamp body 10, but it is removed. The stamp 100 according to the present invention is thus prepared.

Figure 4:
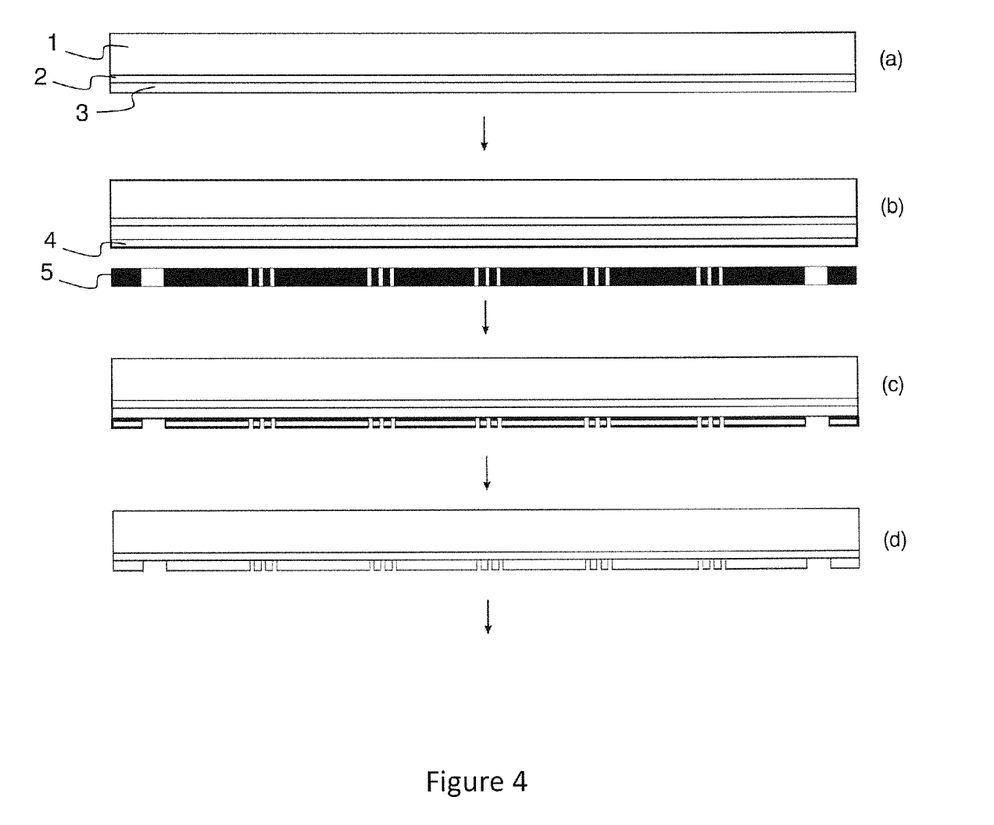

FIG. 4 schematically illustrates an example of a process for preparing a stamp body 10 to be used as basis for preparing the stamp according to the invention.

FIG. 4(a) illustrates a silicon-on-insulator wafer of 380 µm thickness, which consists of a silicon dioxide layer 2 sandwiched by a top silicon layer 1 and a bottom silicon layer 3. The silicon dioxide layer 2 has a thickness of 1 µm of silicon dioxide and the bottom silicon layer 3 has a thickness of 25 µm.

In FIG. 4(b), the bottom layer 3 is provided with a photoresist 4. The photoresist 4 may e.g. be provided by spin coating. The photoresist 4 is covered by a gate mask 5 having circular holes with a diameter of 5 µm, which correspond to the parts which are to become channels 30 between the stamping surface 11 and the bottom wall 21 of the reservoir 20. The photoresist 4 is exposed to UV through the gate mask 5.

In FIG. 4(c), the photoresist 4 exposed to UV is removed.

In FIG. 4(d), silicon of the bottom silicon layer 3 which is not covered by photoresist is removed by deep reactive ion etching. The remaining photoresist 4 is subsequently removed.

In FIG. 4(e), the top silicon layer 1 is similarly provided with a photoresist 6 and the parts which are to become reservoirs 20 are exposed to UV through a gate mask 7 having square holes with a side of 320 µm.

In FIG. 4(f), the photoresist 6 exposed to UV is removed. A layer 8 is subsequently provided on the bottom silicon layer 3. This layer 8 prevents leakage of cooling gas (helium) used in the next deep reactive ion etching step, in case a wafer-through hole is created during etching (which would lead to excessive heating and breaking of the wafer).

In FIG. 4(g), silicon of the top silicon layer 1 which is not covered by photoresist 7 is removed by deep reactive ion etching.

In FIG. 4(h), the exposed silicon oxide 2 is removed and the remaining photoresist 7 is removed. A stamp body 10 according to the present invention is obtained.

EXAMPLES

Fabrication of Silicon Chips with Reservoirs (Stamp Body According to the Invention)

Silicon on insulator wafers with a carrier wafer (a silicon layer for providing the reservoirs), silicon oxide layer and a device layer (a silicon layer for providing the channels) measuring 380 µm, 1 µm, and 25 µm, respectively were used to fabricate the stamps. After standard cleaning procedures, to obtain 5 µm circular arrays, the device layer was provided with a patterned photoresist using standard photolithography. Then, 25 µm deep circular channels were drilled on the device layer using deep reactive ion etching (DRIE). For the DRIE process, sulfur hexafluoride ($SF_6$) and octafluorocyclobutane ($C_4F_8$) was used as the etching gas and the passivating gas, respectively. After stripping the photoresist on the device layer by oxygen plasma etching, the wafer was subjected to standard cleaning and then a pattern of 320×320 µm squares was created by a photoresist on the carrier wafer using standard photolithography. Then, the device layer was laminated with DuPont MX5020 foil to prevent leakage of cooling gas (He) during etching and again a DRIE process was used to create an array of 380 µm deep reservoirs. The photoresist layer and the foil were stripped using an oxygen plasma etcher. The silicon oxide layer that acts as an etch-stop in the DRIE steps and ensures a flat surface profile at the bottom of the reservoirs was etched by treating the wafer with hydrofluoric acid. This procedure yielded chips with 5×5 array of reservoirs measuring 320*320*380 µm and each reservoir having a 25 µm thick membrane consisting of 12×12 array of cylindrical channels with 5 µm diameter. Stamps having different designs were fabricated using different masks for the photolithography steps.

Preparation of Hydrogel-Filled Stamps (Stamp According to the Invention)

Microfabricated silicon chips made as described above were cleaned using piranha solution (3:1 mixture of sulfuric acid and hydrogen peroxide. After washing with copious amount of water and drying, the stamps were coated with an anti-sticking (hydrophobic) layer by gas phase silanization of PFDTS. Then, the stamping surface was brought into conformal contact with a flat PDMS surface to etch the anti-sticking layer from the rest of the stamp. To allow covalent bonding of the hydrogel to the silicon, the interior walls of the reservoirs and the membrane microchannels were then coated with (3-methacryloyloxypropyl) trichlorosilane by gas phase silanization.

For the preparation of hydrogel filled stamps, poly(hydroxyethyl methacrylate-co-ethylene glycol dimethacrylate) (Poly(HEMA)) hydrogels were synthesized by redox initiated radical polymerization using ammonium persulfate (APS) and/tetramethylethylenediamine (TMEA) as a redox initiator pair, ethylene glycol dimethacrylate (EGDMA) as crosslinker and water as solvent. Briefly, the functionalized silicon chips were placed in glass vials sealed with a rubber septum containing the monomer (HEMA) and the crosslinker (EGDMA) in MilliQ water at a desired concentration. After brief application of vacuum to ensure wetting of the microchannels, oxygen was removed from the solution by bubbling Argon for 15 min. Then, the initiators were added and the reaction was allowed to proceed for 12 h under Argon. Then, the gels were carefully taken out of vials and unreacted monomers were extracted by excessive washing with water. Then, the hydrogel-filled stamps were carefully separated from the bulk of the hydrogel with the help of a scalpel. For assessing the morphology of the hydrogel in the bulk and inside the silicon chips, the gels were dehydrated in graded alcohols and subjected to critical point drying followed by sputter-coating with gold. Their surfaces were analyzed by scanning electron microscopy (SEM, Philips XL 30 ESEM-FEG, The Netherlands).

Multiple Times Protein Printing with Hydrogel-Filled Stamps

The hydrogel-filled stamps were gently brought into contact with a piece of lint free paper to remove the non-bound water present inside the micro/nanopores. Then, the stamps were inked from the reservoir side with typically 1-5 µL of FITC conjugated IgG at a concentration of 1.25 µM. To ensure homogeneous inking, the inked stamp was placed in a humid environment at 4° C. for 2 h. Flat poly(dimethylsiloxane) (PDMS) substrates obtained by casting PDMS prepolymer and curing agent against a flat silicon wafer were used as substrates. Protein patterns were obtained by gently bringing the stamps in contact with a UV/ozone treated flat PDMS sample for 5 s after removing the excess ink from the top of the reservoirs. After printing eight times, remaining protein solution was placed on top of the stamp reservoir and another set of eight printings were performed after 5 min. These eight times printing cycles continued until all the ink were consumed. Microarrays of homogeneous spots of IgG corresponding to the channels of the stamp were obtained.

What is claimed is:

1. A stamp for making a microarray of biomolecules, wherein the stamp comprises a stamp body comprising
   a stamping surface for stamping the biomolecules onto a substrate,
   a plurality of reservoirs for liquids comprising the biomolecules, wherein each of the reservoirs has a bottom wall and
   a plurality of channels extending between each of the bottom wall and the stamping surface,
   wherein each of the reservoirs and the channels comprises a macroporous hydrogel and
   wherein the stamping surface is provided with a hydrophobic coating.

2. The stamp according to claim 1, wherein each of the reservoirs has a volume of 4-100 nL.

3. The stamp according to claim 1, wherein a distance between the reservoirs is at least 100 µm.

4. The stamp according to claim 1, wherein each of the channels has a cross section of 0.1-100 µm$^2$.

5. The stamp according to claim 1, wherein the channels have a cross section of a circular, square, ellipsoidal or rectangular shape.

6. The stamp according to claim 1, wherein a distance between the channels is at least 1 µm.

7. The stamp according to claim 1, wherein the hydrogel is made by polymerizing a monomer mixture solution comprising a monomer comprising a hydroxyl or an amino group, wherein the monomer is one or more of (meth)acrylate, (meth)acrylamide and vinyl carbamade, preferably 2-hydroxyethyl methacrylate, 2-hydroxyethyl acrylate, 2-hydroxyethyl methacrylamide, 3-hydroxypropyl methacrylate, hydroxyhexyl methacrylate and hydroxyoctyl methacrylate; 2-aminoethyl methacrylate, 2-aminoethyl acrylate, 3-aminopropyl methacrylate; 2-hydroxyethyl methacrylamide, 2-hydroxyethyl acrylamide; N-2-aminoethyl methacrylamide; and N-2-hydroxyethyl vinyl carbamate.

8. The stamp according to claim 7, wherein the monomer mixture solution comprises the monomer at a concentration of 15-25 vol %.

9. The stamp according to claim 1, wherein an adhesion promoter coating is provided on inner surfaces of the reservoirs and the channels, wherein the coating comprises a compound represented by the general formula:

$$RSiX_3 \qquad (I)$$

where R represents an organic functional group containing a (meth)acryloyl group and X represents a hydrolyzable group.

10. The stamp according to claim 1, wherein the hydrophobic coating on the stamping surface comprises fluorinated alkyl silanes, long-chain alkyl silanes having at least 6 carbon atoms, long chain acylglycerols having at least 12 carbon atoms, sterol derivatives, pentafluorophenyl derivatives and/or reaction products with fatty acids having at least 10 carbon atoms.

11. The stamp according to claim 1, wherein the reservoirs comprise the liquids comprising the biomolecules, at a concentration of 0.05-10 µM, wherein the biomolecules are biomolecules of about 1000 to about 900,000 Daltons.

12. A process for making a microarray of biomolecules comprising: the step of stamping a substrate by the stamp according to claim 1.

13. A process for making the stamp according to claim 1, comprising the steps of:
 a. providing the stamp body and
 b. providing the macroporous hydrogel in the reservoirs and the channels to form the stamp.

14. The process according to claim 13, wherein step b. comprises the sub-steps of:
 b1. providing a coating of an adhesion promoter on inner surfaces of the reservoirs and the channels,
 b2. dipping the stamp body in a solution of reactive monomers and
 b3. reacting the reactive monomers to form the macroporous hydrogel, wherein the process further comprises the step of providing a hydrophobic coating on the stamping surface before step b1.

15. The stamp according to claim 1, wherein each of the reservoirs has a volume of 10-50 nL, wherein a distance between the reservoirs is at least 100 µm, and wherein each of the channels has a cross section of 10-30 µm².

16. The stamp according to claim 15, wherein the channels have a cross section of a circular, square, ellipsoidal or rectangular shape, wherein a distance between the channels is at least 1 µm, and wherein the hydrogel is made by polymerizing a monomer mixture solution comprising a monomer comprising a hydroxyl or an amino group, wherein the monomer is one or more of (meth)acrylate, (meth)acrylamide and vinyl carbamade, preferably 2-hydroxyethyl methacrylate, 2-hydroxyethyl acrylate, 2-hydroxyethyl methacrylamide, 3-hydroxypropyl methacrylate, hydroxyhexyl methacrylate and hydroxyoctyl methacrylate; 2-aminoethyl methacrylate, 2-aminoethyl acrylate, 3-aminopropyl methacrylate; 2-hydroxyethyl methacrylamide, 2-hydroxyethyl acrylamide; N-2-aminoethyl methacrylamide; and N-2-hydroxyethyl vinyl carbamate.

17. The stamp according to claim 16, wherein the monomer mixture solution comprises the monomer at a concentration of 15-25 vol %, wherein an adhesion promoter coating is provided on inner surfaces of the reservoirs and the channels, wherein the coating comprises a compound represented by the general formula:

$$RSiX_3 \qquad (I)$$

where R represents an organic functional group containing a (meth)acryloyl group and X represents a hydrolyzable group; wherein the hydrophobic coating on the stamping surface comprises fluorinated alkyl silanes, long-chain alkyl silanes having at least 6 carbon atoms, long chain acylglycerols having at least 12 carbon atoms, sterol derivatives, pentafluorophenyl derivatives and/or reaction products with fatty acids having at least 10 carbon atoms; and wherein the reservoirs comprise the liquids comprising the biomolecules, at a concentration of 0.05-10 µM, wherein the biomolecules are biomolecules of about 1000 to about 900,000 Daltons.

18. The stamp according to claim 7, wherein the monomer mixture solution further comprises a crosslinker comprising one or more of ethylene glycol dimethacrylate, trimethylolpropane trimethacrylate, glycerol trimethacrylate, polyethylene glycol dimethacrylate and N,N'-methylene bisacrylamide.

19. The stamp according to claim 18, wherein the monomer mixture solution comprises the monomer at a concentration of 15-25 vol %; and wherein an adhesion promoter coating is provided on inner surfaces of the reservoirs and the channels, wherein the coating comprises a compound represented by the general formula:

$$RSiX_3 \qquad (I)$$

where R represents an organic functional group containing a (meth)acryloyl group and X represents a hydrolyzable group.

20. The stamp according to claim 19, wherein the hydrophobic coating on the stamping surface comprises fluorinated alkyl silanes, long-chain alkyl silanes having at least 6 carbon atoms, long chain acylglycerols having at least 12 carbon atoms, sterol derivatives, pentafluorophenyl derivatives and/or reaction products with fatty acids having at least 10 carbon atoms; and wherein the reservoirs comprise the liquids comprising the biomolecules, at a concentration of 0.05-10 µM, wherein the biomolecules are biomolecules of about 1000 to about 900,000 Daltons.

* * * * *